Figure 1:
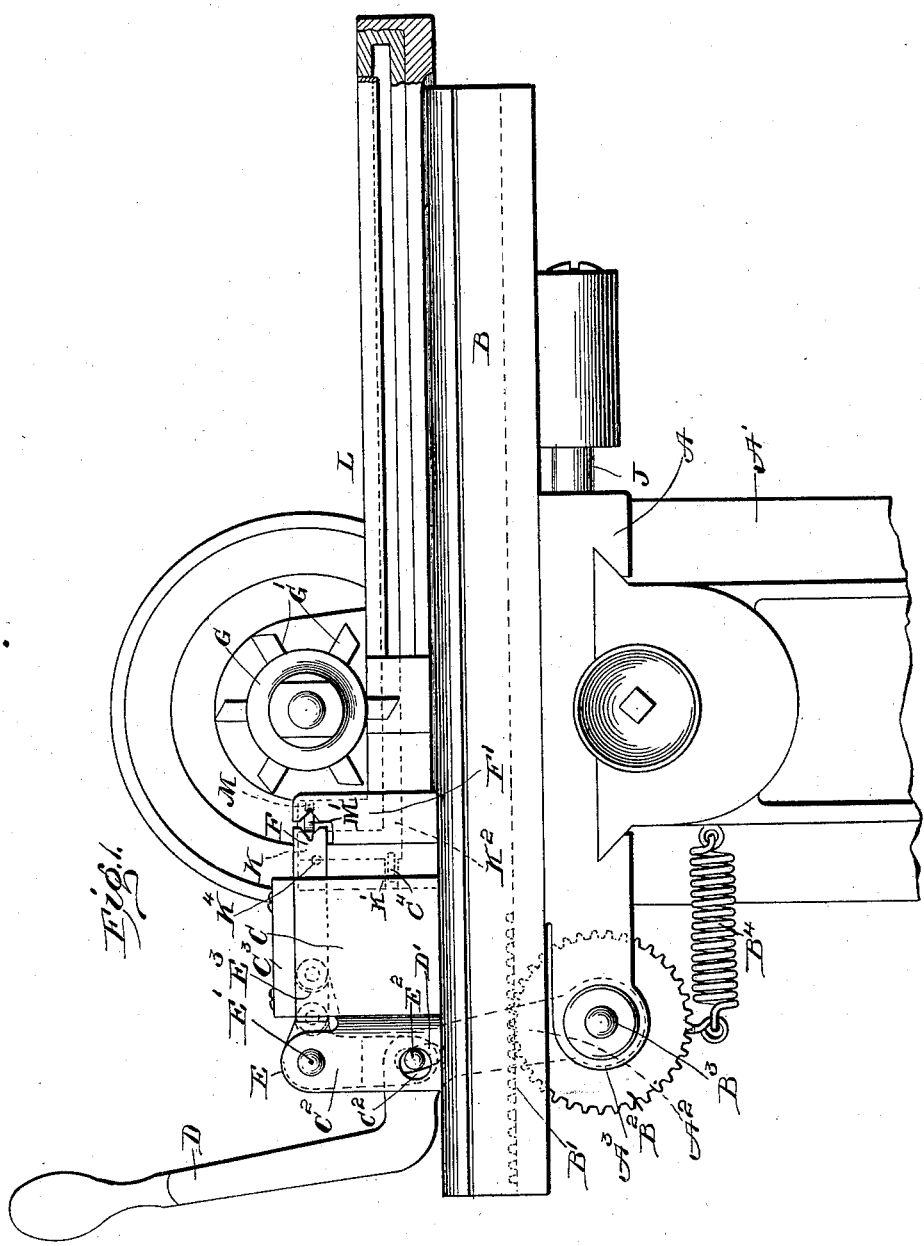

No. 686,327. Patented Nov. 12, 1901.
F. H. PIERPONT.
MACHINE FOR CUTTING PIECES OF UNIFORM LENGTH FROM RODS OR BARS.
(Application filed June 5, 1901.)
(No Model.) 6 Sheets—Sheet 1.

Witnesses.
Inventor:
Frank H. Pierpont
by Church & Church
his Attys.

No. 686,327. Patented Nov. 12, 1901.
F. H. PIERPONT.
MACHINE FOR CUTTING PIECES OF UNIFORM LENGTH FROM RODS OR BARS.
(Application filed June 5, 1901.)
(No Model.) 6 Sheets—Sheet 2.

Witnesses:
Inventor: Frank H. Pierpont

No. 686,327. Patented Nov. 12, 1901.
F. H. PIERPONT.
MACHINE FOR CUTTING PIECES OF UNIFORM LENGTH FROM RODS OR BARS.
(Application filed June 5, 1901.)
(No Model.) 6 Sheets—Sheet 3.

Witnesses.
J. M. Fowler Jr.
Thomas Durant.

Inventor:
Frank H. Pierpont
by Church & Church
his Attys.

No. 686,327. Patented Nov. 12, 1901.
F. H. PIERPONT.
MACHINE FOR CUTTING PIECES OF UNIFORM LENGTH FROM RODS OR BARS.
(Application filed June 5, 1901.)
(No Model.) 6 Sheets—Sheet 4.
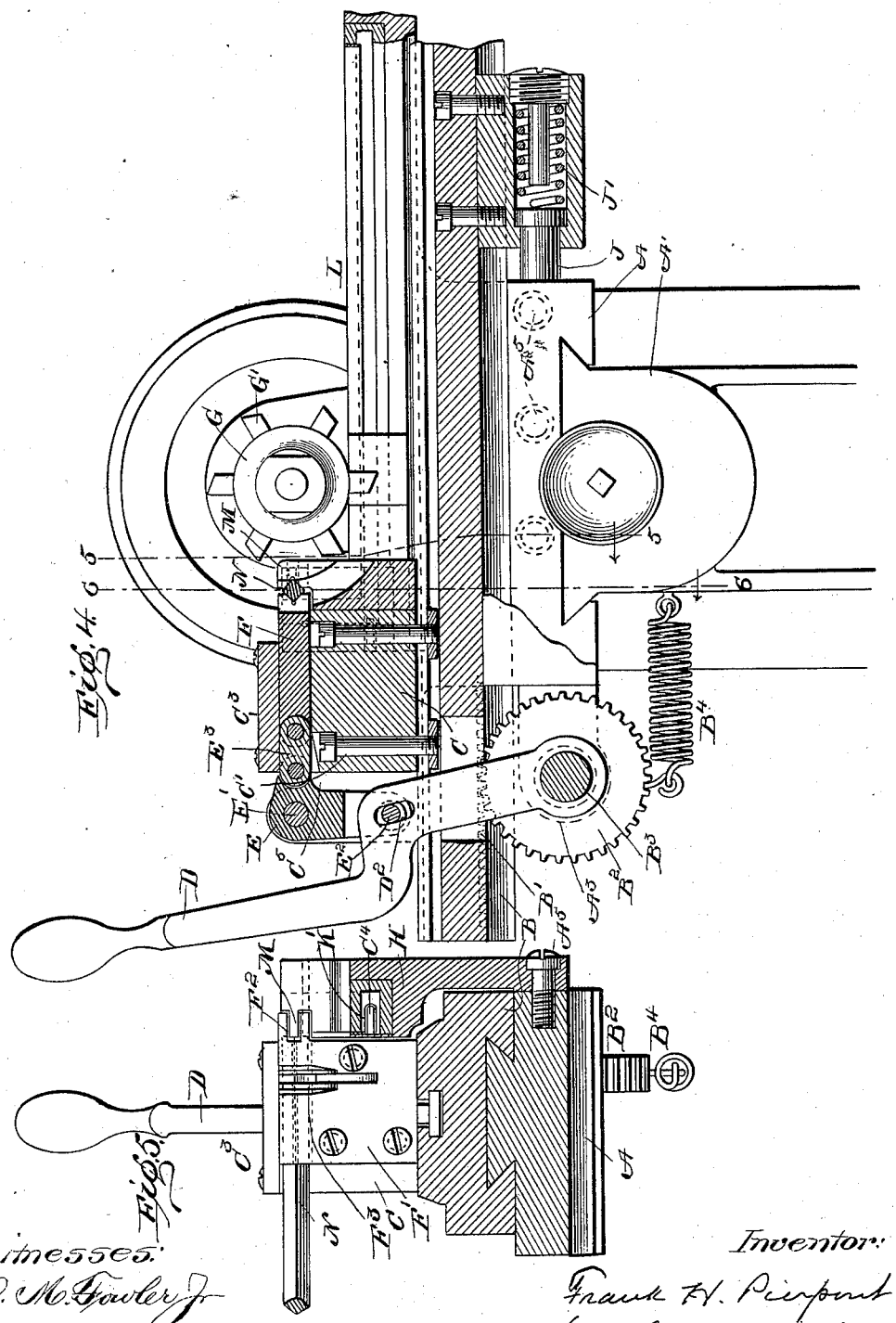
Witnesses:
J. M. Fowler Jr.
Thomas Durant.
Inventor:
Frank H. Pierpont
by Church & Church
his Attys.

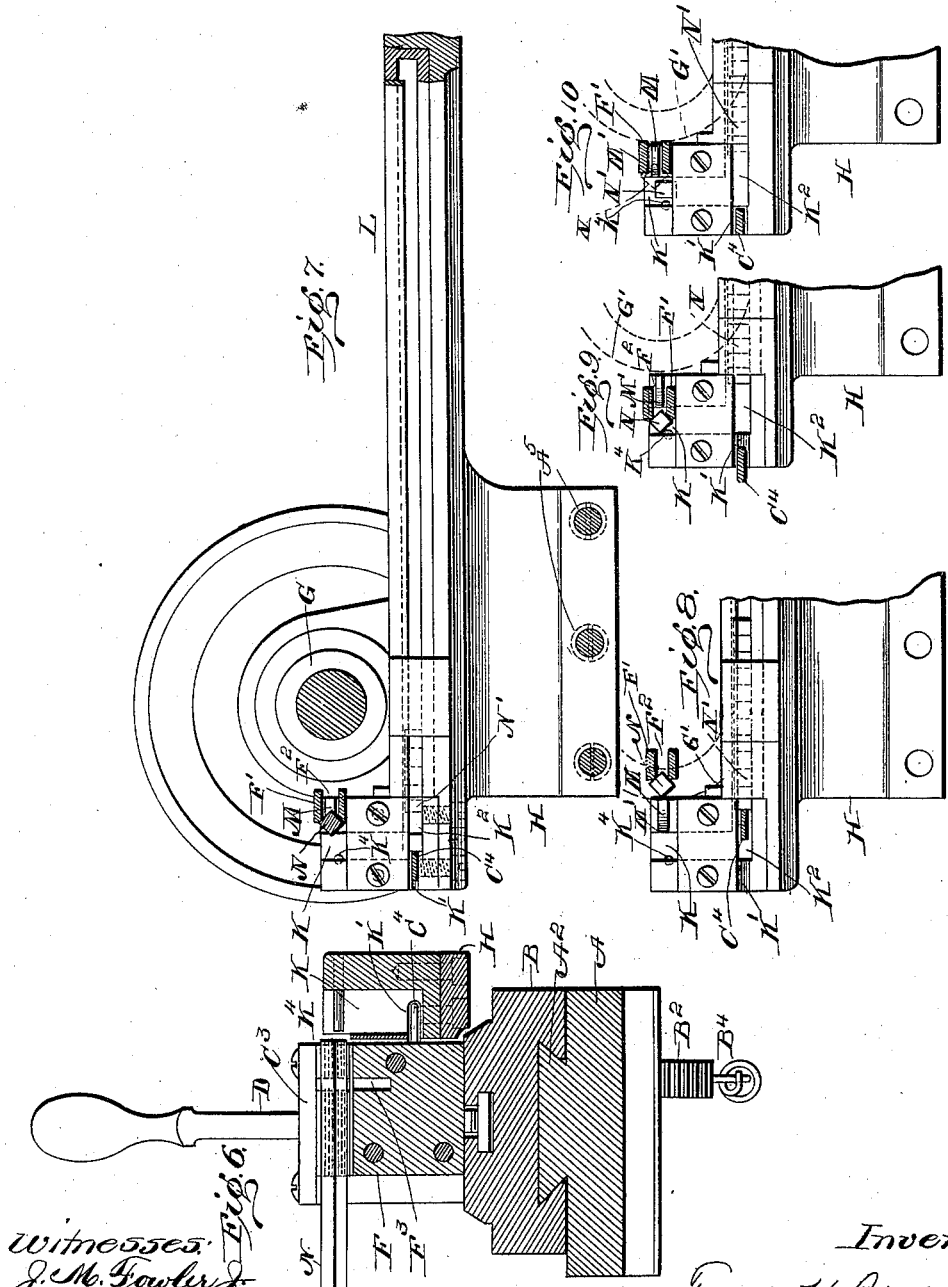

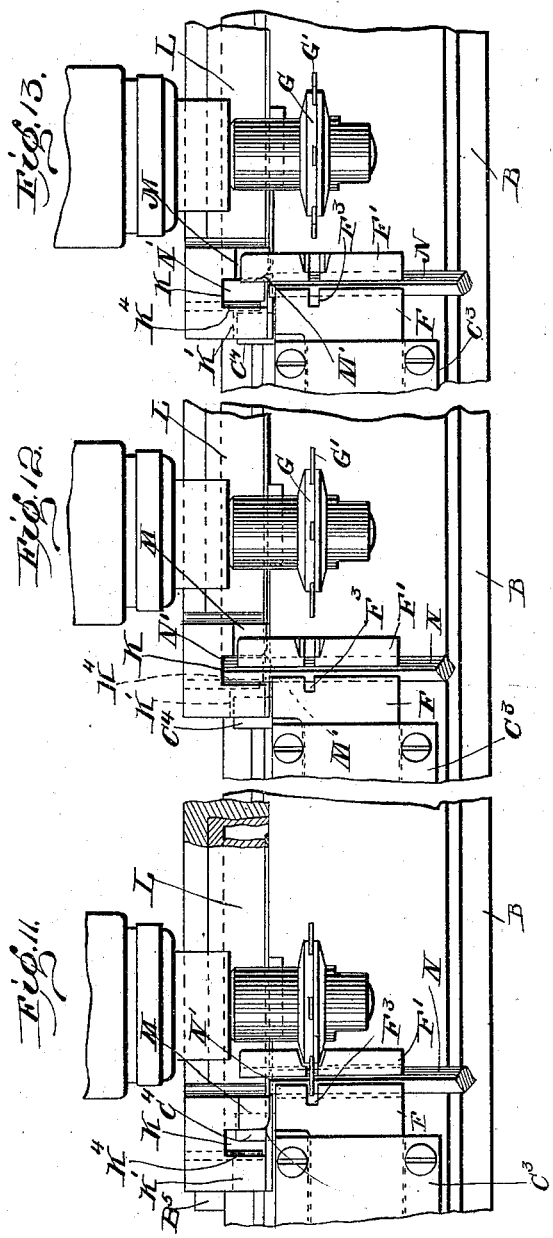

UNITED STATES PATENT OFFICE.

FRANK HINMAN PIERPONT, OF HORLEY, ENGLAND, ASSIGNOR TO LANSTON MONOTYPE MACHINE COMPANY, OF WASHINGTON, DISTRICT OF COLUMBIA, A CORPORATION OF VIRGINIA.

MACHINE FOR CUTTING PIECES OF UNIFORM LENGTH FROM RODS OR BARS.

SPECIFICATION forming part of Letters Patent No. 686,327, dated November 12, 1901.

Application filed June 5, 1901. Serial No. 63,281. (No model.)

*To all whom it may concern:*

Be it known that I, FRANK HINMAN PIERPONT, a citizen of the United States, residing at Horley, in the county of Surrey, England, have invented certain new and useful Improvements in Machines for Cutting Pieces of Uniform Length from a Rod or Bar; and I do hereby declare the following to be a full, clear, and exact description of the same, reference being had to the accompanying drawings, forming a part of this specification, and to the letters of reference marked thereon.

The object of this invention is to provide a machine to cut off automatically pieces of uniform length from a bar or rod of metal or other material and to automatically place the pieces thus cut off side by side in a receptacle.

A machine for carrying out this invention comprises a slide having a gripping device and a pusher and reciprocating at right angles to a preferably revolving cutter, a fixed stop placed by the side of the jaws, but outside the slide, a chute, and a receptacle for the lengths of metal cut off. The gripping device is arranged so that at one extremity of the stroke of the slide its jaws are open, allowing the metal rod to be operated upon to pass freely between them. The rod, pushed by hand or by constantly-running friction-rollers through these open jaws, comes in contact with the fixed stop. As the slide advances the jaws of the gripping device are gradually closed and the rod forced slightly backward by an incline on the fixed stop. Before the slide has advanced far enough to bring the cutter in contact with the metal rod the latter has been properly positioned by the stop and securely gripped by the jaws. The slide is then advanced until the cutter has cut through the rod, when its motion is reversed and it is carried back past the fixed stop opposite the chute into which the cut-off portion is pushed by the rod, the jaws being now open. On again advancing the slide the cut-off portion falls to the bottom of the chute, whence the pusher drives it into a convenient receptacle, while the rod, engaging again with the fixed stop, is positioned for a fresh cut.

Figure 2:
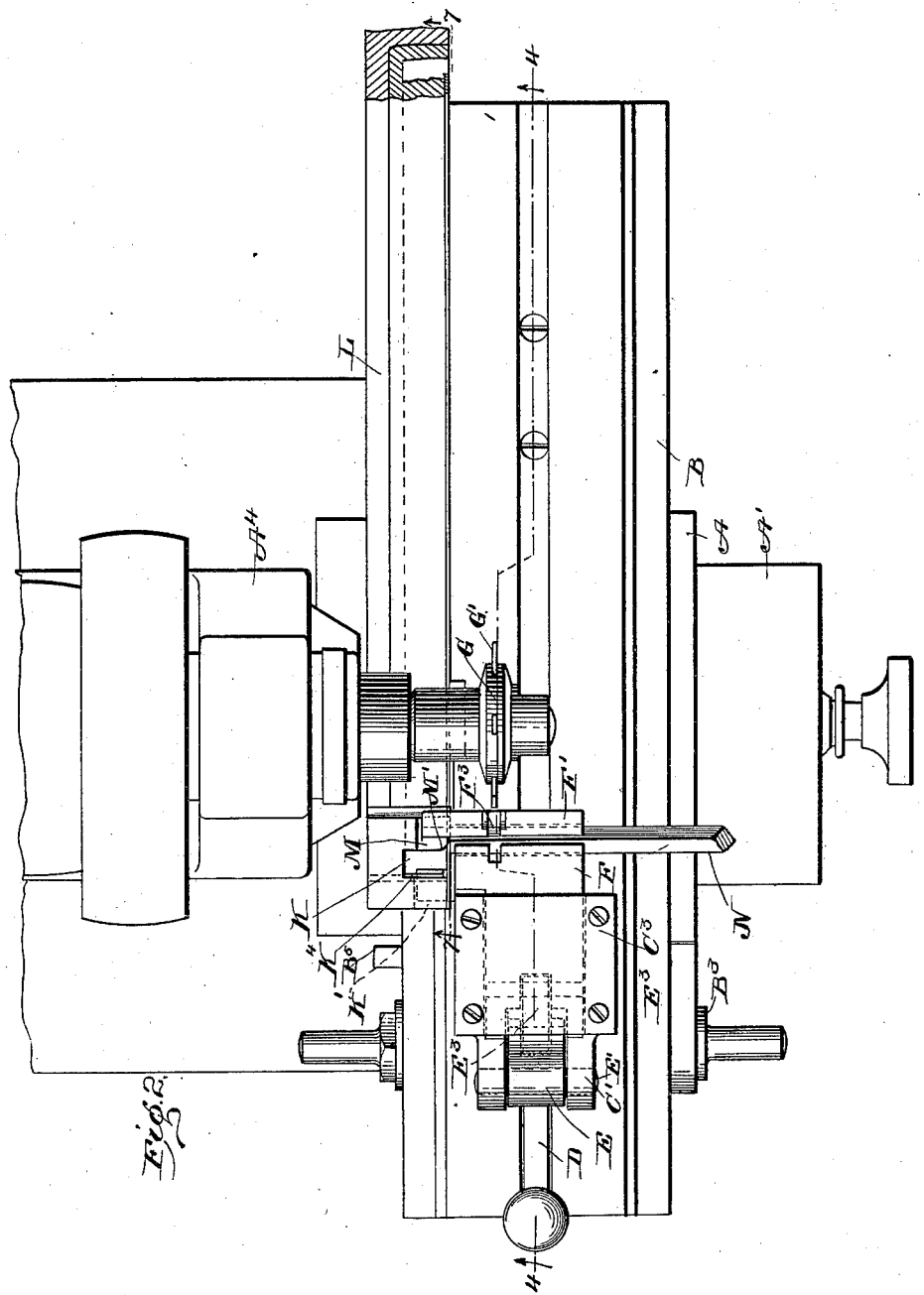
Figure 3:
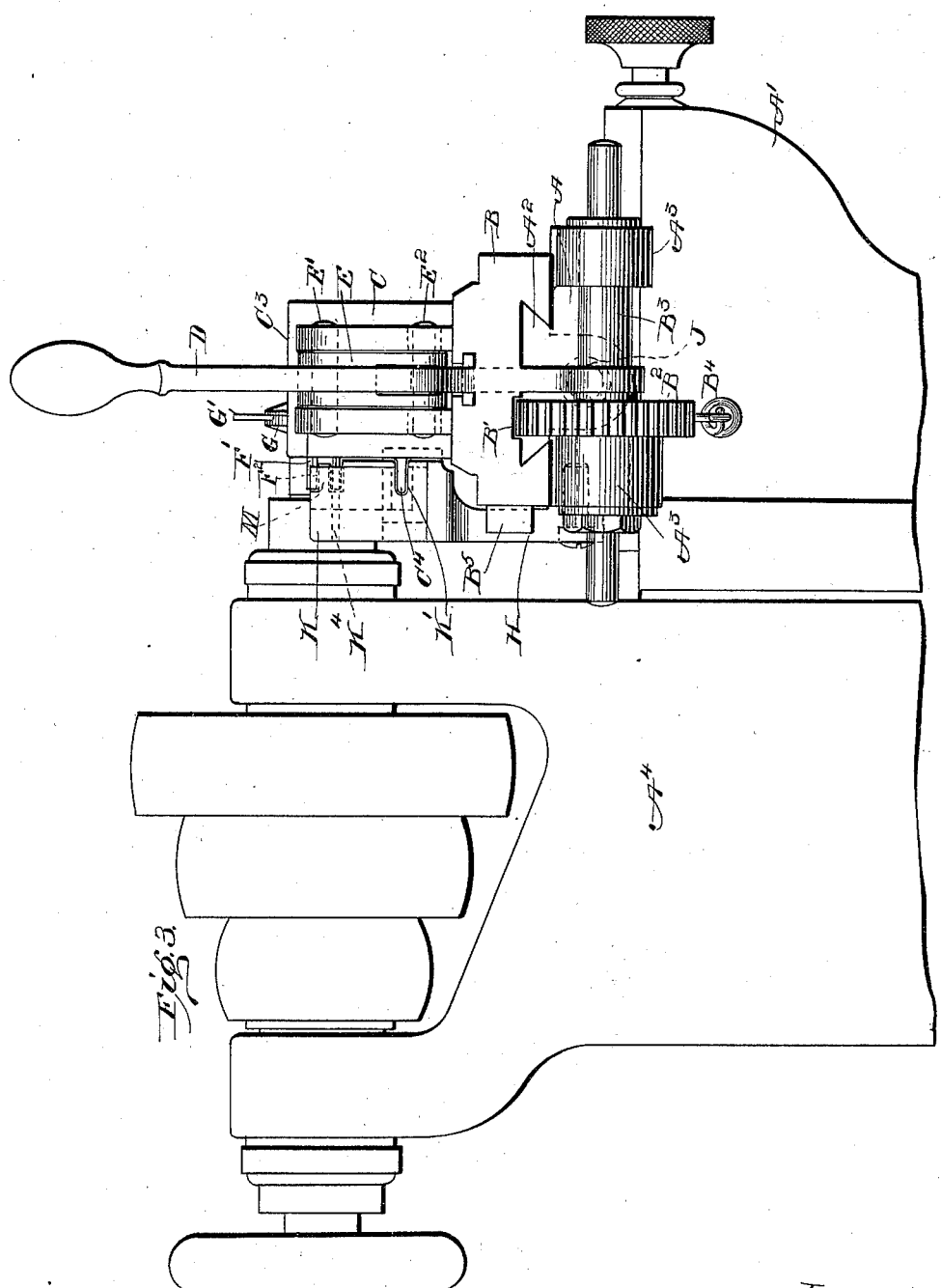

In the accompanying drawings, Figure 1 is a front view of a preferred form of machine constructed according to this invention. Fig. 2 is a plan. Fig. 3 is an end elevation looking at the left-hand side of the machine. Fig. 4 is a section on the line 4 4 of Fig. 2. Fig. 5 is a section on the line 5 5 of Fig. 4. Fig. 6 is a section on the line 6 6 of Fig. 4. Fig. 7 is a section on the line 7 7 of Fig. 2. Figs. 8, 9, and 10 are similar views (part cut away) to Fig. 7, showing various stages of operation of the machine. Figs. 11, 12, and 13 are plan views respectively of Figs. 8, 9, and 10.

Like letters of reference in the several figures indicate the same parts.

A is the bed of the machine, adjustably carried in a dovetail guide of the standard A'. On the bed A is a sliding table B, likewise carried in a dovetail guide $A^2$, its movement on the bed being at right angles to the movement of the bed on its standard. Secured on the upper surface of the table B— say by set-bolts C'—is a jaw block or body C, and formed on the under side of one end of the table is a rack B', engaged with a cog-wheel $B^2$, carried on a spindle $B^3$, borne in lugs $A^3$ on the bed A. The tension of a spring $B^4$, one end of which is connected to the wheel $B^2$ and the other to the standard A', brings the table B back to normal position after movement toward the right, as shown in Figs. 1 and 2.

Loosely carried on the spindle $B^3$ is a handle D. Pivoted on a rod E', carried in lugs $C^5$ of the body C, is a bell-crank lever E, in the lower arm of which is fixed a spindle $E^2$. This spindle engages in a slot D' in the handle D, and likewise in a hole $C^2$ in each of the lugs $C^5$, the holes $C^2$ being larger in diameter than the spindle $E^2$. The upper arm of the bell-crank lever E is connected by a link $E^3$ with a sliding plate F, which forms the movable member of the jaws to hold the rod to be cut, and which is carried in guides or a recess in the body C, conveniently formed by a plate $C^3$, screwed thereon, as shown in the figures. The fixed member of the jaw is formed on a plate F', screwed onto the front face of the body C. This fixed member extends at one end beyond the movable member, and this extension is provided with a slot $F^2$, for a purpose to be hereinafter described. Both members of the jaws are provided with a slot F³ to receive the blades G' of the cutting-tool G. This revoluble cutter, mounted on a standard A⁴, may be of any usual construction and driven in any convenient fashion.

Fixed on one side of the body C is a pin or plate (which I call the "pusher") C⁴, Figs. 3 and 6, the object of which will be hereinafter described.

The table B is provided at one end with a stop B⁵, Fig. 3, to limit its movement toward the right, and a stop J its movement toward the left. This latter stop is provided with a spring J', Fig. 4, to bring the table back to normal position after full reciprocation to the left.

Rigidly fixed onto the bed A—say by set-screws A⁵—is a plate H. Formed on or secured to one end of this plate, so as to be opposite the jaws of the gripping device when the table is on its extreme position toward the left, is a chamber or chute K to receive the pieces when cut off the rod. This chute is the length of the pieces cut off and slightly wider than the same. It may be built up in any convenient manner. The bottom of the chute is provided at the left-hand side with an opening K', through which the pusher C⁴, hereinbefore described, passes as the table reciprocates, and ejects from the chute at each movement of the table toward the right hand the piece of rod cut off and deposited therein during the preceding reciprocation, an opening K² being provided for this purpose in the opposite wall of the chute. A receptacle or galley L to receive the pieces thus ejected may be provided, resting on the plate H, its open end corresponding to and placed against the opening K² of the chute.

Fixed onto the top of the right-hand wall of the chute K, which is made lower than the others for this purpose, is a plate which forms and is hereinafter called the "fixed stop" M, and is so arranged as to pass through the slot F² of the extension of the fixed jaw of the gripping device before described. One edge of the fixed stop is provided with a slight curve M', as shown in Figs. 2 and 11. An offset is provided on the inner wall of the chute opposite to and slightly below the fixed stop. This may take the form of a pin K⁴, as shown in the figures.

The operation of the machine is as follows: In Figs. 2 and 4 the machine is shown in the position in which the jaws have just gripped the rod N, positioned against the fixed stop M. By pushing the handle toward the right and overcoming the tension of the spring B⁴, the spindle E² being against the right-hand wall of the hole C², the table B and with it the gripping-block C are moved toward the right, and the cutter-blades enter the slot F³ and divide the rod. This position of the cutter and gripping device is shown in Figs. 8 and 11. By relieving the pressure on the handle D the spring B⁴ (by the cog-wheel B² and rack B') moves the gripping device toward the left into the position shown in Figs. 1, 2, and 4. The operator now pulls the handle D toward the left. The first action of the spindle E² is to loosen the grip of the jaws through its action on the bell-crank lever E. Then having reached the left-hand wall of the hole C² it moves the gripping-block bodily to the left until arrested by the stop J. The rod is now opposite the chute K and the operator putting slight pressure on the rod the cut-off portion N' is pushed into the chute, one side being held in the extension of the fixed jaw and the other resting on the offset K⁴, as shown in Figs. 9 and 12. The operator now releasing the handle D, the spring J' pulls the gripping-block toward the right. The end of the rod N is brought into contact with the curved portion M' of the stop M, and thus being forced slightly backward is again positioned against the straight edge of the same. The cut-off piece N', freed from the hold of the fixed-jaw extension, assumes the position shown in Figs. 10 and 13 and falls to the bottom of the chute, ready to be pushed into the galley L by the pusher C⁴ when the gripper-block is advanced for the next cut. A slight movement of the handle D toward the right clamps the jaws ready for a fresh cut.

In the machine herein described and illustrated the rod is placed in position by hand. It is obvious that roller-gear may readily be applied to automatically feed the rod.

Having thus described my invention, what I claim as new, and desire to secure by Letters Patent, is—

1. In a machine for cutting a rod into pieces of uniform length the combination with a cutter and a fixed stop of a reciprocating gripping device, and independent spring-controlled devices to normally hold the same so that its jaws are approximately in line with the fixed stop, substantially as described.

2. In a machine for cutting a rod into pieces of uniform length the combination with a cutter and a reciprocating gripping device of a fixed stop having a curved portion M', substantially as and for the purpose described.

3. In a machine for cutting a rod into pieces of uniform length the combination with a cutter, a fixed stop, a receiving-chute and a gripping device, the jaws of which are normally held approximately in line with the fixed stop, of means to move the gripping device either toward the cutter and at the same time close the gripper-jaws, or toward the chute and at the same time open the jaws; and spring-controlled devices to return the gripping device in each case to normal position without affecting the position of the jaws relatively to each other, substantially as described.

4. In a gripping device having a fixed jaw and a movable jaw capable of reciprocation in a slide, the combination for opening and shutting the jaws of a rocking handle pivoted at one end and having a slot D' engaging a pin on one arm of a bell-crank lever E of which the other arm is connected by a link to the movable jaw, substantially as described.

5. In a reciprocating gripping device a body with a fixed jaw, a movable jaw reciprocating in guides in the body, a bell-crank lever pivoted in lugs on the body and having one arm linked to the movable jaw while its other arm has a pin $E^2$ engaged loosely in holes $C^2$ in the aforesaid lugs, a rocking lever pivoted at a fixed point independent of the gripping device and having a slot D' in which the pin $E^2$ is also engaged, all combined and operating, substantially as described.

6. In a machine for cutting a rod into pieces of uniform length, and in combination, a fixed chute with an offset in the upper part of one side wall, and a reciprocating gripping device, so placed relatively to each other, that an extension of one jaw of the gripping device forms part of a wall of the chute opposite to the offset, when the gripping device is at one extreme of its movement, substantially as described.

7. In a machine for cutting a rod into pieces of uniform length, and in combination, a gripping device fixed on a sliding table, and having one fixed and one movable jaw, a rocking handle carried on a stationary spindle and having a slot engaging a pin on one arm of a bell-crank lever carried on the gripping device and having its other arm operatively connected with the movable jaw, said pin being also engaged in holes in the gripping device, means, such as teeth B' wheel $B^3$ and spring $B^4$, to return the gripping device to normal position after movement in one direction, and a spring-controlled stop J J' to return the same after movement in the opposite direction, substantially as described.

FRANK HINMAN PIERPONT.

Witnesses:
W. J. ROGERS,
R. R. WILSON.